March 26, 1940.  J. R. WUEST  2,194,993
DOG CARRIER FOR MOTOR VEHICLES
Filed Oct. 17, 1938  2 Sheets-Sheet 1
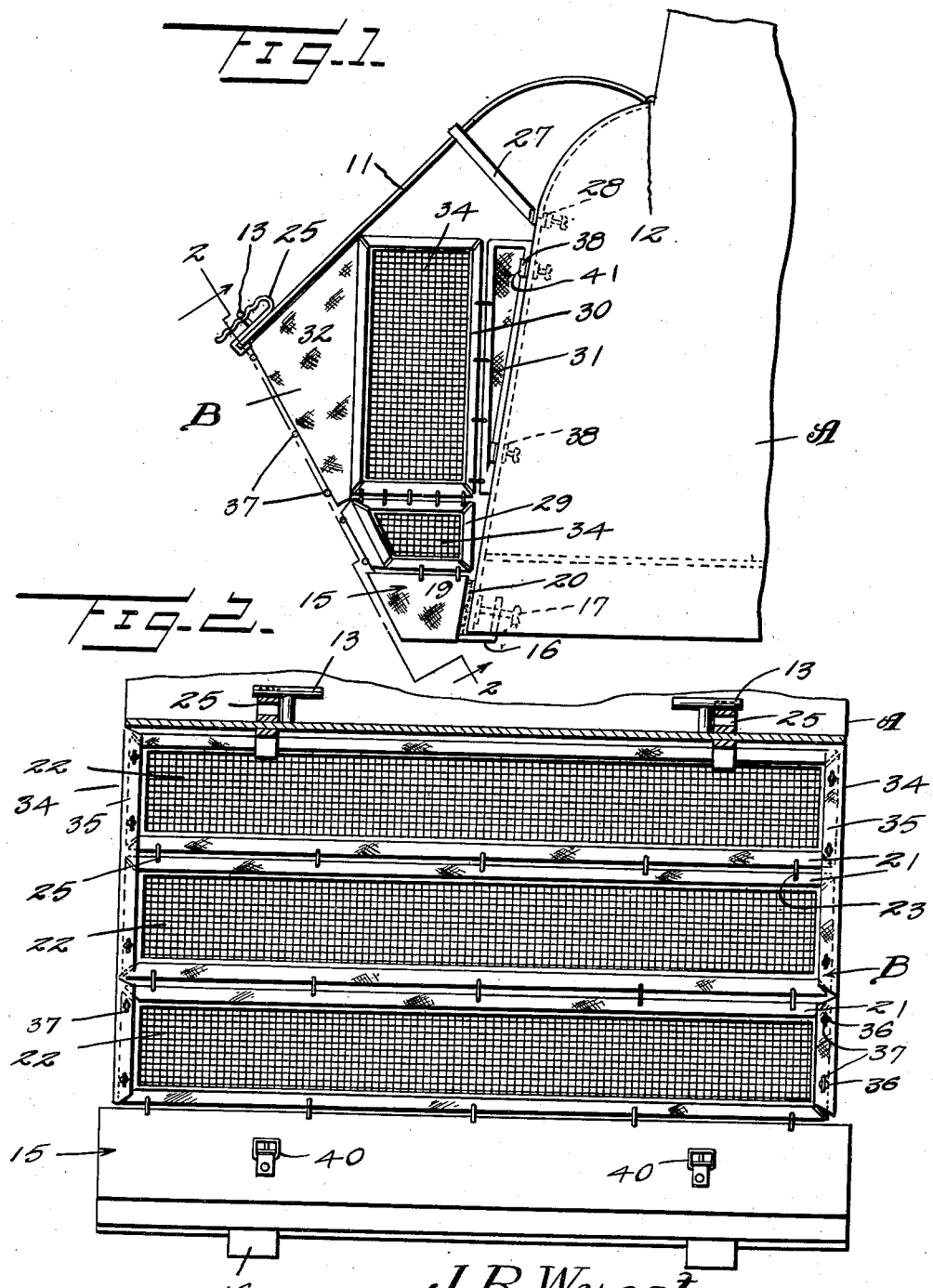
J. R. Wuest
INVENTOR
BY Victor J. Evans & Co.
ATTORNEYS

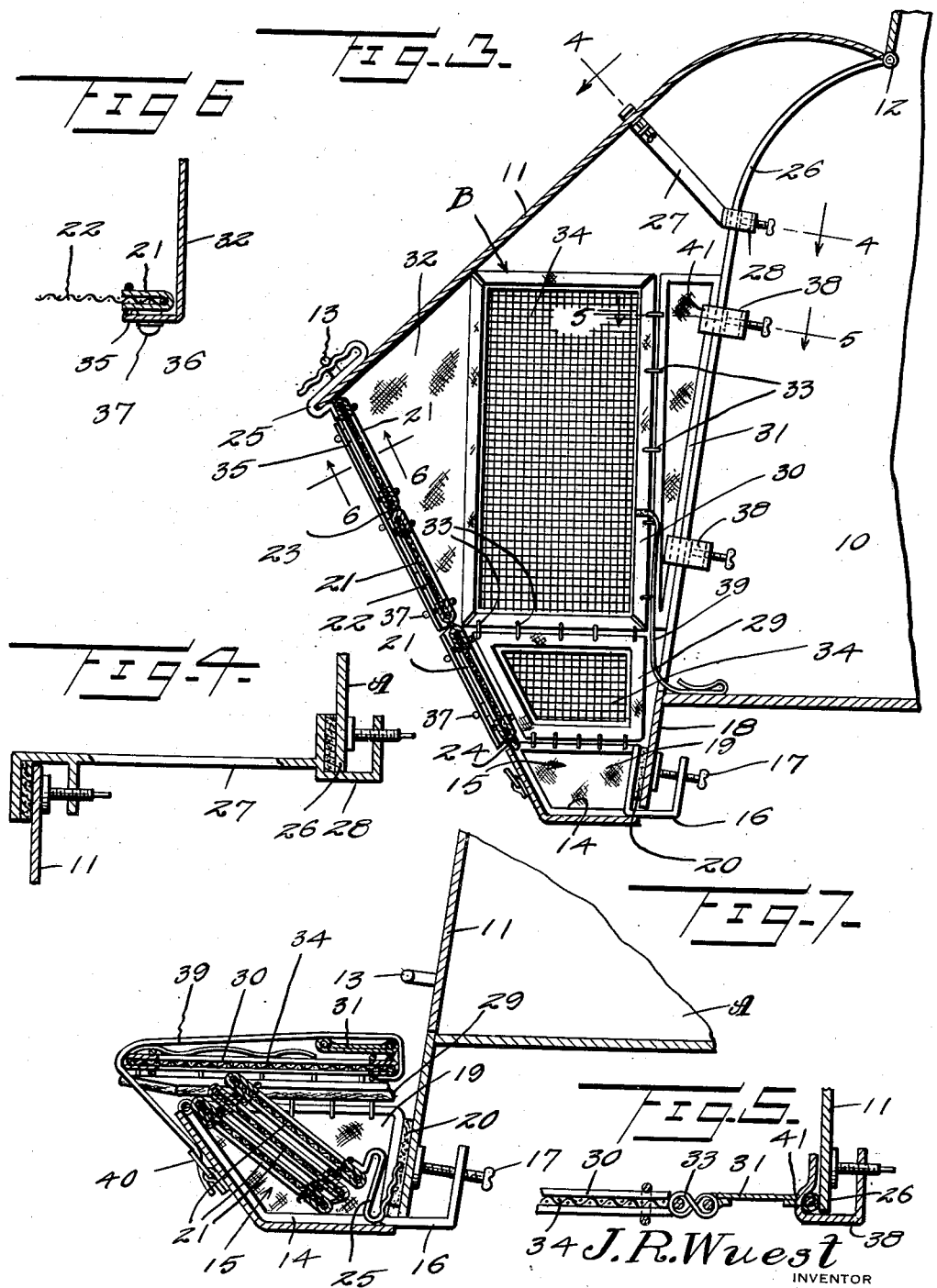

Patented Mar. 26, 1940

2,194,993

UNITED STATES PATENT OFFICE 2,194,993

DOG CARRIER FOR MOTOR VEHICLES

Judson R. Wuest, Monroe, Mich.

Application October 17, 1938, Serial No. 235,536

3 Claims. (Cl. 224—29)

The invention relates to a foldable attachment for motor vehicles usable in connection with the tonneau or rear end thereof at the trunk or luggage compartment and more especially to animal and fowl carriers.

The primary object of the invention is the provision of a device of this character, wherein on the opening of the hinged door or cover for the opening in the rear end of the body of a motor vehicle wherein luggage is generally stored, there can be caged animals or fowls or the like, particularly hunting dogs, so that the same can be conveniently transported from one destination to another and without discomfort to the animals or the chances of possible escape while in transit.

Another object of the invention is the provision of a device of this character, wherein the same when not in use can be conveniently folded or collapsed and when in this condition allows the closing of the rear end or tonneau of such motor vehicle so that luggage can be stored therein in the conventional manner, the device being of novel construction in its entirety, and on the setting up thereof for the housing of animals, fowls or the like through ventilation is assured to avoid discomfort to the animals, fowls or the like when being vehicularly transported.

A further object of the invention is the provision of a device of this character, wherein the same can be folded or knocked down or set up with dispatch and when set up for use will satisfactorily house animals, fowls or the like within the tonneau of the vehicle for their transportation.

A still further object of the invention is the provision of a device of this character, which is simple in its construction, thoroughly reliable and efficient in operation, easily fitted to standard makes of motor vehicles having tonneaus or luggage compartments within the rear ends of their bodies, strong, durable and inexpensive to manufacture and install.

With these and other objects in view, the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 1 is a fragmentary side elevation of the luggage compartment end of the body of a motor vehicle showing the door or cover therefor in a raised position and the device constructed in accordance with the invention applied for the caging of animals, fowls or the like within said compartment.

Figure 2 is a fragmentary sectional view taken on the line 2—2 of Figure 1 looking in the direction of the arrows.

Figure 3 is a fragmentary vertical longitudinal sectional view.

Figure 4 is a sectional view taken on the line 4—4 of Figure 3 looking in the direction of the arrows.

Figure 5 is a fragmentary sectional view taken on the line 5—5 of Figure 3 looking in the direction of the arrows.

Figure 6 is a fragmentary sectional view taken on the line 6—6 of Figure 3 looking in the direction of the arrows.

Figure 7 is a fragmentary vertical sectional view through one end of the device when collapsed.

Similar reference characters indicate corresponding parts throughout the several views in the drawings.

Referring to the drawings in detail, A designates generally a portion of the rear end of the body of a motor vehicle having built therein a luggage compartment 10, as is conventional, and this rear end is generally termed the trunk end of the vehicle body. Access is had in the usual and well-known manner to the compartment 10 on the raising of a door or cover section 11, being hinged at 12 for vertical raising and lowering thereof. The door or cover section 11, when lowered, closes access to the compartment 10 and is latched in any suitable manner in closed position. The latches (not shown) generally are manually controlled by handles 13, in this instance two in number being shown. For association with the compartment end of the body of the motor vehicle and its door or cover section 11 is the device constituting the present invention and denoted generally at B in the drawings.

The device B comprises a tray-like bottom unit involving a skeleton frame 14 of strip metal and to which is applied a water-proof covering 15 of canvas which completes the tray formation of the said unit and this frame 14 has formed therewith clamps 16, two in number, although the number may be increased if desired, and each carries a set screw 17. These clamps engage about the skirt 18 of the body walling of the motor vehicle so as to fasten the tray unit in place at the rear end of the body and below the points of access to the compartment 10. The clamps 16 permit the removal of the tray unit from placement and fastening to the body of the vehicle when required. Each end 19 of the covering 15 has a flap edge 20 engageable in the clamp 16 adjacent thereto so that it can be made taut and closing the respective ends of said tray unit.

Connected with the outermost upper side edge of the frame 14 of the tray unit is the foldable walling unit involving a series or group of foldable frames 21 having reticulated or wire mesh ventilating centers 22, these frames being swingingly connected by links 23 to each other and also swingingly connected to the tray unit by links 24, respectively, so that the said wall unit can be extended by unfolding thereof or collapsed by the folding of the frames 21 and when these frames are in their folded relation to each other they are lowered into the tray unit, as shown in Figure 7 of the drawings, being in a collapsed condition.

The outermost of the frames 21 of the wall unit has fitted thereto spring grippers 25, these being engageable with the handles 13 when the door or cover section 11 is in a raised open position, as shown in Figures 1 and 3 of the drawings, and in this manner the said wall unit will be held in its extended condition.

Engageable with the door or cover section 11 and with the edging 26 of the opening for the latter and giving access to the compartment 10 are double clamp braces, one being indicated at 27 and its clamps at 28. Two of these braces 27 are employed, one on each side of the door or cover section 11, and when so engaged therewith the edging 26 will hold the door or cover section 11 in its raised open position, as is clearly shown in Figures 1 and 3 of the drawings. In this position the door or cover section effects a top covering for the device or carrier.

Connected with the upper edges of opposite ends of the frame 14 are foldable end walling units, each involving the frames 29, 30 and 31, respectively, and the water-proof curtain 32 of canvas, the frame 30 being built into the curtain 32 while the frames 29 and 31 are swingingly connected to this frame 30 by links 33 and these frames 29, 30 and 31 have reticulated or wire mesh centers 34 for ventilating purposes. The linkage 33 between the said frames permits the folding thereof, one superposed to the other, as is shown in Figure 7 of the drawings, when the device is collapsed and not in use.

Each curtain 32 is formed with flaps 35 provided with button holes 36 for receiving fasteners 37 permanently carried at the ends of the frames 21 when the said flaps 35 are turned over these ends, and in this manner the end walling units are separably attached to the side walling unit.

The frame 31 of each end walling unit is separably fastened to the edging 26 by clamps 38 and in this manner these end walling units are extended or set up for the caging of animals, fowls or the like when within the compartment 10 in the body A of the motor vehicle so that such animals, fowls or the like can be transported by such vehicle within the compartment 10, the device being especially adaptable for transporting hunting dogs vehicularly without discomfort during transportation.

The walling units when folded or collapsed are accommodated in association with the tray unit and become compact in the manner as shown in Figure 7 of the drawings when the device is not in use. This compact condition of the device enables the door or cover section 11 to be closed or lowered and thus excluding access to the compartment 10 or for the safe storing of luggage therein in the conventional manner for the transportation of the same by the vehicle.

Each frame 30 carries a strap 39 for engagement with its companion buckle 40 carried on the tray unit exteriorly thereof and in this manner the folded condition on the side and end walling can be maintained in relation to the tray unit.

Each frame 31 is provided at the point for the engagement of a clamp 38 therewith with a clearance 41 for such clamp to assure the clamping of the said frame 31 with the edging 26, as is clearly shown in Figures 1, 3 and 5 of the drawings.

When the end walling units are set up, they are perpendicular and the side walling unit in its set-up inclines in the direction of the rear end or tonneau of the body of the vehicle.

The grippers 25 are readily releasable from the handles 13 due to the inherent yieldability thereof and the make-up of the same.

The flaps 35 are detached from the fasteners 37 at the button holes or slots 36 in said flaps and in this manner the curtains 32 are separated from the side walling unit when it is desired to collapse or fold the latter and also the end walling units.

The tray unit of the device affords a support for the said walling units when the latter are folded or collapsed and in this manner the tray unit can be carried by the body A of the vehicle indefinitely at the option of the operator thereof.

What is claimed is:

1. A carrier for a vehicle body having an open tonneau provided with a vertically swingable door opening upwardly to an overhanging relation to the opening in said tonneau, comprising an open top box-like unit for fastening to the vehicle body entirely below the tonneau opening and overhung by the door when open and having vertical permanent side and end walls, reticulated foldable frames having connection with the said unit and forming end and side closure wall units thereto and foldable into the tray, grippers associated with the side wall unit and separably snapped into engagement with a latch handle on said door, flexible curtains carried by the end wall units and separably engaged therewith, means for fastening the end wall units with the edging of the tonneau opening, and means separably fastening the curtain with said side wall unit.

2. A carrier for a vehicle body having an open tonneau provided with a vertically swingable door opening upwardly to an overhanging relation to the opening in said tonneau, comprising an open top box-like unit for fastening to the vehicle body entirely below the tonneau opening and overhung by the door when open and having vertical permanent side and end walls, reticulated foldable frames having connection with the said unit and forming end and side closure wall units thereto and foldable into the tray, grippers associated with the side wall unit and separably snapped into engagement with a latch handle on said door, flexible curtains carried by the end wall units and separably engaged therewith, means for fastening the end wall units with the edging of the tonneau opening, means separably fastening the curtain with said side wall unit, and braces engageable with the door and the edges of the tonneau opening for holding the door in an open position and completely roofing the carrier.

3. A carrier for a vehicle body having an open tonneau provided with a vertically swingable door opening upwardly to an overhanging relation to the opening in said tonneau, comprising an open top box-like unit for fastening to the vehicle body entirely below the tonneau opening and overhung by the door when open and having vertical permanent side and end walls, reticulated foldable frames having connection with the said unit and forming end and side closure wall units thereto and foldable into the tray, grippers associated with the side wall unit and separably snapped into engagement with a latch handle on said door, flexible curtains carried by the end wall units and separably engaged therewith, means for fastening the end wall units with the edging of the tonneau opening, means separably fastening the curtain with said side wall unit, braces engageable with the door and the edges of the tonneau opening for holding the door in an open position and completely roofing the carrier, and means for strapping the wall units in folded relation to and within the tray unit.

JUDSON R. WUEST.